Figures 1, 2:
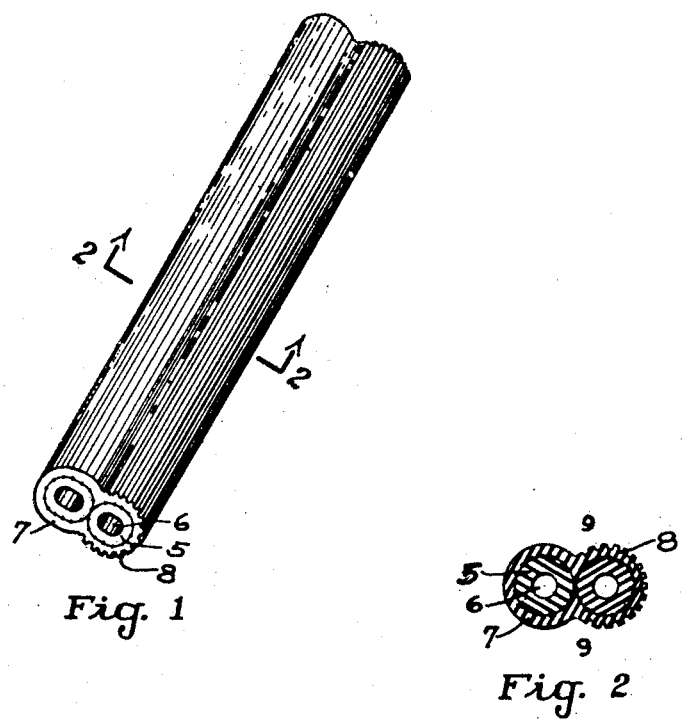

May 6, 1947. C. J. BELL 2,420,221
DUPLEX WELDING TUBE
Filed Oct. 8, 1945

INVENTOR.
CHARLES J BELL
BY
ATTORNEY

Patented May 6, 1947

2,420,221

UNITED STATES PATENT OFFICE 2,420,221

DUPLEX WELDING TUBE

Charles J. Bell, Chicago, Ill., assignor to The Gates Rubber Company, Denver, Colo., a corporation of Colorado Application October 8, 1945, Serial No. 621,030

1 Claim. (Cl. 138—87)

This invention relates to improvements in welding hose of the duplex type.

In oxy-acetylene welding, oxygen and acetylene are conducted to a burner through separate tubes which, for convenience, are interconnected along their tangent points so as to form a unitary structure. The welding nozzles are constructed in such a way that the two gases are mixed very close to the point where they emerge and it is essential that the two gases shall be connected with the proper nipples of the burners. If the connections are accidentally reversed, the necessary mixing action will not take place and accidents may occur.

It is customary to conduct the two gases to the burners through a hose comprising two tubes of different colors, the tube carrying the oxygen being usually colored red.

Where a difference in color alone is dependent upon to distinguish the tubes from each other, mistakes are sometimes made. In many places where the welding takes place, the light is poor and the colors are not readily distinguishable, causing the operator to make the wrong connection. Another reason for mistakes occurring is that, due to the constant handling by hands that are covered with grease and dirt, the two colors soon become indistinguishable with the result that unless great care is taken, a wrong connection may be made.

It is the object of this invention to produce a duplex hose for use in acetylene welding which shall be so constructed that the two tubes of which it is formed can be readily distinguished by touch alone, therefore making it possible to effect the correct connection in the dark.

Another object of the invention is to produce a duplex hose in which the two tubes are enclosed in a unitary envelope or covering of rubber-like material, which makes a stronger construction and one that has greater lasting and wearing qualities than where the two tubes are joined along the line of tangency only.

Having thus briefly described the invention, the same will now be described in greater detail and for this purpose reference will be had to the accompanying drawing in which the invention has been illustrated in its preferred form, and in which:

Figure 1 is a perspective view showing a short length of duplex hose constructed in accordance with this invention; and Figure 2 is a cross section taken on line 2—2, Figure 1.

The duplex hose consists of two tubular members which may be of identical construction, each of the tubular members has a body 5 of rubber or some material having rubber characteristics. This body is provided with an opening 6 through which the gas may flow. Surrounding the tubular body 5 is a reenforcing layer which may be cords wrapped or braided thereabout. The two tubes are placed side by side with adjacent surfaces in contact and are then covered with an outer layer 7 of rubber or any rubber-like material. The outer layer may be applied by an extrusion method or in any other suitable manner and is applied in intimate contact with the outer surfaces of the tubes. The outer surface of the covering 7, about one of the tubes, is provided with longitudinal ribs 8 extending to the center line 9 and the outer surface of the covering surrounding the other tube is smooth. The assembly, after it has the outer surface applied thereto, is subjected to a suitable curing operation.

The finished hose has an appearance somewhat as indicated in Figure 1. At the end where the two tubes are to be connected with the burner or at the other end where connection is made with the gas tanks the tubes are separated by a cut along line 9—9, for as long a distance as may be necessary.

The color of the outside covering is the same for each tube, but, due to the ribbed surface on the outside of one of the tubes, this is clearly distinguishable both visually and by touch alone.

The duplex hose that has been described above and illustrated on the drawing has safety properties of great importance because the construction enables the operator to select whichever one of the tubes he desires with certainty. If the light is sufficient, the two tubes can be readily distinguished visually, but where the light is defective, or absent, the tubes can be identified by touch alone. The outer envelope makes the assembly uniform throughout and gives to the duplex tube greater than wearing properties and longer life than similar tubes that are merely welded along their tangent contacting surfaces. The outer envelope also resists puncture and adds to the strength of the construction and also gives the hose a pleasing and ornamental appearance.

Having described the invention what is claimed as new is:

In a duplex welding hose, two tubes positioned in contact and enclosed in a continuous cover of material having ruber-like characteristics, means for identifying the tubes by touch alone comprising a series of longitudinal ribs on substantially one-half of the cover and a smooth surface on the other half.

CHARLES J. BELL.

REFERENCES CITED

The following references are of record in the file of this patent:

UNITED STATES PATENTS

| Number | Name | Date |
|---|---|---|
| 909,027 | Sanders | Jan. 5, 1909 |
| 1,729,160 | Engle | Sept. 24, 1928 |
| 2,139,888 | Fausek | Dec. 13, 1938 |